(12) United States Patent
Aihara

(10) Patent No.: US 8,019,217 B2
(45) Date of Patent: Sep. 13, 2011

(54) STORAGE SYSTEM AND OPTICAL MODULE SWITCHING METHOD FOR STORAGE SYSTEM

(75) Inventor: Hideyuki Aihara, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 805 days.

(21) Appl. No.: 12/022,561

(22) Filed: Jan. 30, 2008

(65) Prior Publication Data

US 2009/0110399 A1    Apr. 30, 2009

(30) Foreign Application Priority Data

Oct. 31, 2007   (JP) ................................. 2007-283536

(51) Int. Cl.
*G02F 1/00* (2006.01)
(52) U.S. Cl. ............. 398/5; 398/1; 398/2; 398/3; 398/4; 398/7; 398/33; 398/58; 398/66; 398/68; 398/72; 370/231; 370/242; 370/244; 370/248; 709/223; 709/224; 709/238; 709/239; 714/5; 714/43
(58) Field of Classification Search .................. 398/1, 3, 398/5, 2, 4, 7, 8, 10, 12, 13, 14, 17, 19, 20, 398/22, 23, 24, 25, 27, 26, 33, 34, 38, 45, 398/48, 49, 55, 56, 57, 58, 145, 66, 59, 67, 398/68, 72; 370/244, 228, 219, 352, 231, 370/242, 248; 709/224, 223, 238, 239, 229; 714/5, 43, 6, 42, 44, 48
See application file for complete search history.

(56) References Cited

U.S. PATENT DOCUMENTS

| 7,275,103 | B1 * | 9/2007 | Thrasher et al. ............... 709/224 |
| 7,685,269 | B1 * | 3/2010 | Thrasher et al. ............... 709/224 |
| 2006/0215552 | A1 | 9/2006 | Iwata et al. |

FOREIGN PATENT DOCUMENTS

JP          2006-268625 A      10/2006
* cited by examiner

*Primary Examiner* — Hanh Phan
(74) *Attorney, Agent, or Firm* — Brundidge & Stanger, P.C.

(57) ABSTRACT

An object of the present invention is to continue to send and receive to/from a host when a failure has occurred in a storage device interface. A storage system includes a host and a storage device connected to the host via a communication line, wherein the storage device comprises a communication controller performing data communication with the host by using optical modules, and wherein the communication controller is provided with first optical modules performing data communication with the host; a second optical module performing data communication with the host, in place of a first optical module; and a controller switching, when a failure has occurred in any of the first optical modules, the first optical module in which the failure has occurred to the second optical module.

9 Claims, 17 Drawing Sheets

FIG.10

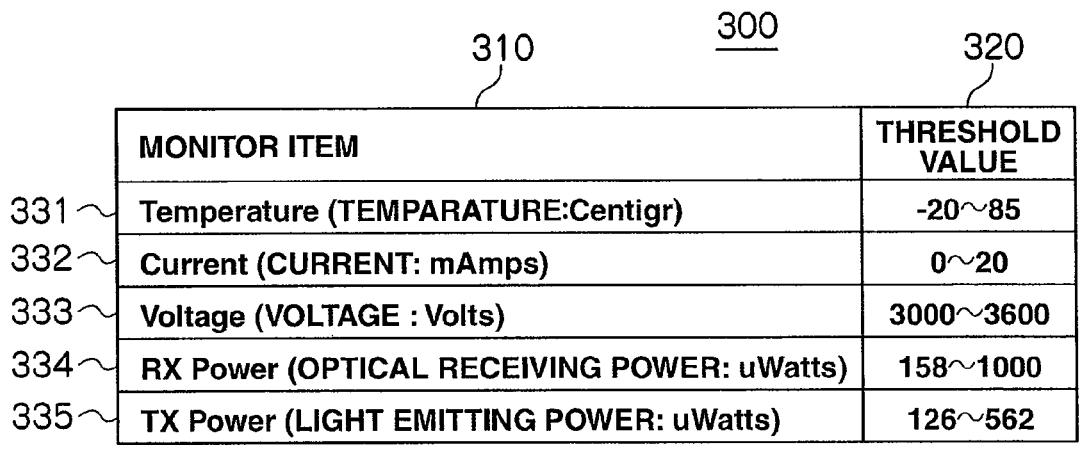

| | MONITOR ITEM | THRESHOLD VALUE |
|---|---|---|
| 331 | Temperature (TEMPARATURE:Centigr) | -20~85 |
| 332 | Current (CURRENT: mAmps) | 0~20 |
| 333 | Voltage (VOLTAGE : Volts) | 3000~3600 |
| 334 | RX Power (OPTICAL RECEIVING POWER: uWatts) | 158~1000 |
| 335 | TX Power (LIGHT EMITTING POWER: uWatts) | 126~562 |

FIG.11

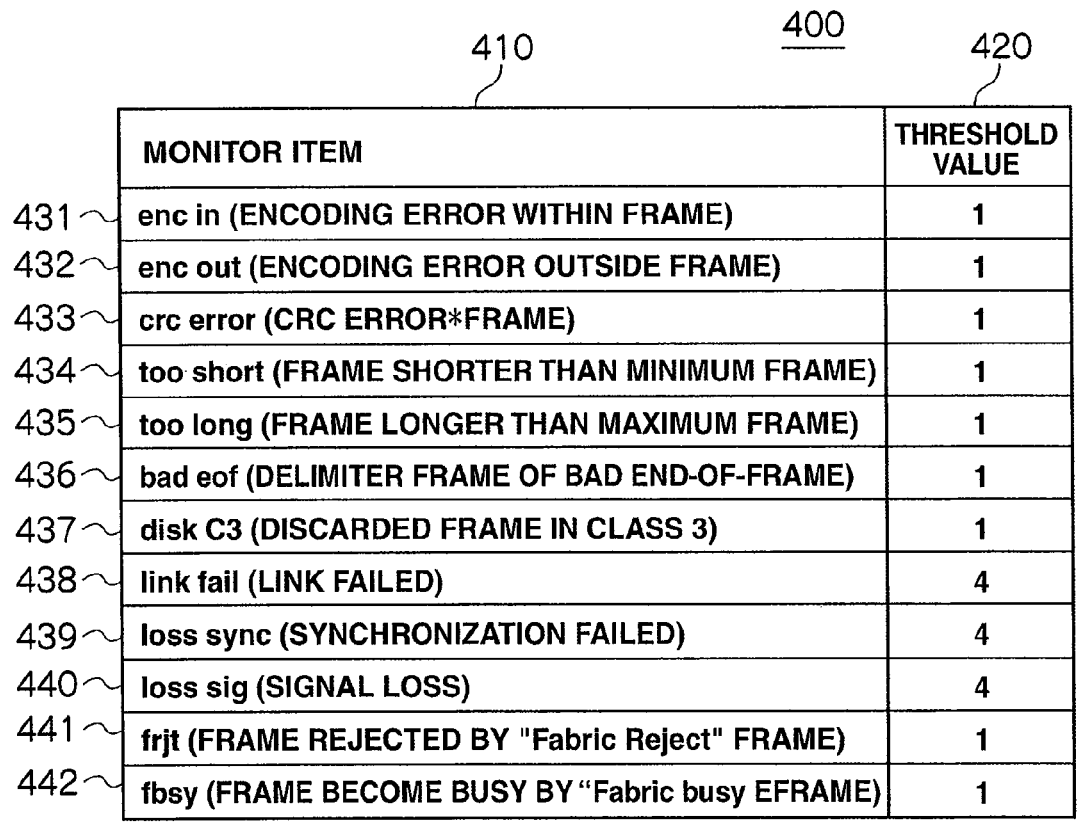

| | MONITOR ITEM | THRESHOLD VALUE |
|---|---|---|
| 431 | enc in (ENCODING ERROR WITHIN FRAME) | 1 |
| 432 | enc out (ENCODING ERROR OUTSIDE FRAME) | 1 |
| 433 | crc error (CRC ERROR*FRAME) | 1 |
| 434 | too short (FRAME SHORTER THAN MINIMUM FRAME) | 1 |
| 435 | too long (FRAME LONGER THAN MAXIMUM FRAME) | 1 |
| 436 | bad eof (DELIMITER FRAME OF BAD END-OF-FRAME) | 1 |
| 437 | disk C3 (DISCARDED FRAME IN CLASS 3) | 1 |
| 438 | link fail (LINK FAILED) | 4 |
| 439 | loss sync (SYNCHRONIZATION FAILED) | 4 |
| 440 | loss sig (SIGNAL LOSS) | 4 |
| 441 | frjt (FRAME REJECTED BY "Fabric Reject" FRAME) | 1 |
| 442 | fbsy (FRAME BECOME BUSY BY "Fabric busy EFRAME) | 1 |

|  | Temperature 501 | Current 502 | Voltage 503 | RX Power 504 | TX Power 505 |
|---|---|---|---|---|---|
| SFP-A | 60 | 10 | 33000 | 500 | 300 |
| SFP-B | | | | | |
| SFP-C | | | | | |
| SFP-D | | | | | |
| SFP-E | | | | | |
| SFP-F | | | | | |
| SFP-G | | | | | |
| SFP-H | | | | | |
| SFP-Z | | | | | |

| | enc in | enc out | crc error | too shrt | too long | bad eof | disk C3 | link fail | loss sync | loss sig | frjt | fbsy |
|---|---|---|---|---|---|---|---|---|---|---|---|---|
| | 601 | 602 | 603 | 604 | 605 | 606 | 607 | 608 | 609 | 610 | 611 | 612 |
| Port-A | 0 | 0 | 0 | 0 | 0 | 0 | 0 | 1 | 2 | 1 | 0 | 0 |
| Port-B | | | | | | | | | | | | |
| Port-C | | | | | | | | | | | | |
| Port-D | | | | | | | | | | | | |
| Port-E | | | | | | | | | | | | |
| Port-F | | | | | | | | | | | | |
| Port-G | | | | | | | | | | | | |
| Port-H | | | | | | | | | | | | |
| Port-Z | | | | | | | | | | | | |

| PORT (710) | FLAG (720) |
|---|---|
| Port-A | ON |
| Port-B | ON |
| Port-C | OFF |
| Port-D | OFF |
| Port-E | OFF |
| Port-F | OFF |
| Port-G | OFF |
| Port-H | OFF |

FIG.15

|  | HOST MODE | | | | | PORT PARAMETER | | | |
|---|---|---|---|---|---|---|---|---|---|
|  | HP-UX | AIX | Solaris | Windows | OTHER | Address | Fabric | Connection | Channel Speed |
| Port-A | | | | | | | | | |
| Port-B | | | | | | | | | |
| Port-C | | | | | | | | | |
| Port-D | | | | | | | | | |
| Port-E | | | | | | | | | |
| Port-F | | | | | | | | | |
| Port-G | | | | | | | | | |
| Port-H | | | | | | | | | |

FIG.16

| | HOST MODE | | | | | PORT PARAMETER | | | |
|---|---|---|---|---|---|---|---|---|---|
| | HP-UX | AIX | Solaris | Windows | OTHER | Address | Fabric | Connection | Channel Speed |
| Port-A | | | | | | | | | |
| Port-B | | | | | | | | | |
| Port-C | | | | | | | | | |
| Port-D | | | | | | | | | |
| Port-E | | | | | | | | | |
| Port-F | | | | | | | | | |
| Port-G | | | | | | | | | |
| Port-H | | | | | | | | | |

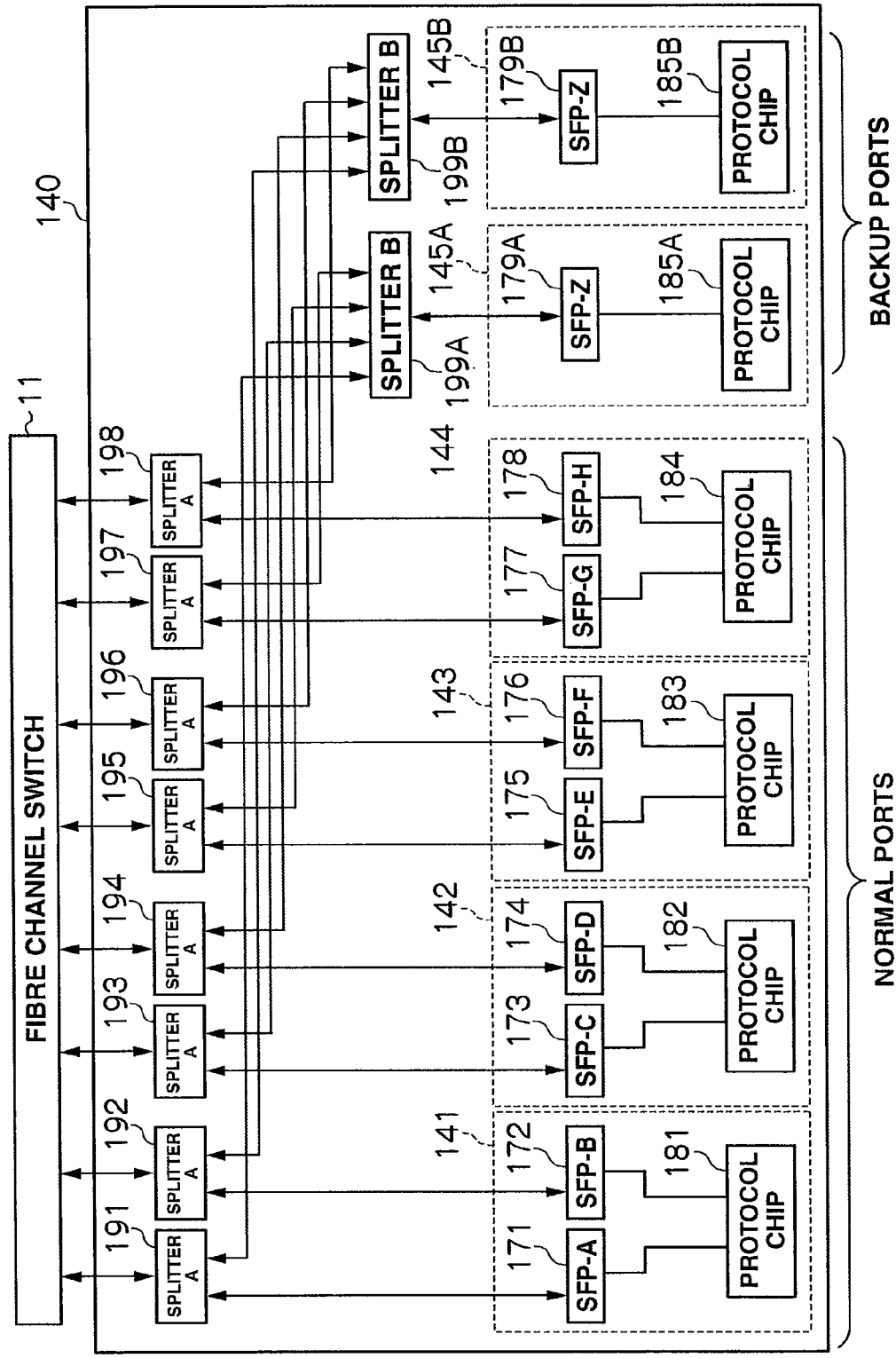

STORAGE SYSTEM AND OPTICAL MODULE SWITCHING METHOD FOR STORAGE SYSTEM

CROSS-REFERENCES TO RELATED APPLICATIONS

This application relates to and claims priority from Japanese Patent Application No. JP2007-283536, filed on Oct. 31, 2007, the entire disclosure of which is incorporated herein by reference.

BACKGROUND

1. Field of the Invention

The invention relates generally to a storage system and an optical module switching method for a storage system, and it is particularly suitable for application in, for example, a storage system and an optical module switching method for switching an optical module for connection to the host of a storage device in a storage system.

2. Description of Related Art

Conventionally, in a storage system, for example, a host and a storage device interconnect via a fibre channel. The storage device has an interface in its interior for connecting to a host, and a plurality of optical module units in the interface are respectively connected to the host. In such a storage system, redundant paths exist between a host and a storage device in cases an interface line fails. The situation where an interface line fails has been handled by switching the redundant paths using alternate path software installed in the host.

There is a known technique to make managing access paths easy by knowing a spot that may cause a bottleneck because of traffic congestion in advance (see JP2006-268625 A).

SUMMARY

Most of the failures that occur in an interface line in a storage system are optical module failures in the interface. Therefore, a conventional configuration such as one switching paths using path-switching software cannot respond to cases when a failure has occurred in the optical module unit in the interface, and as a result, the storage device cannot send and receive data to/from the host until the optical module unit is changed.

Furthermore, when a failure has occurred in the optical module in the interface has not been considered in JP2006-268625 A.

The current invention has been devised in consideration of the above-described points, and it is an object of the present invention to provide a storage system and a optical module switching method for a storage system capable of, when an failure occurs in an interface in a storage device, continued sending and receiving of data to/from a host.

According to an aspect of the invention, a storage system comprises a host and a storage device connected to the host via a communication line, wherein the storage device comprises a communication controller performing data communications with the host using optical modules, and wherein the communication controller is provided with first optical modules performing data communications with the host; a second optical module performing data communications with the host, in place of the first optical module; and a controller switching, when a failure occurs in any of the first optical modules, the first optical module in which the failure occurs to the second optical module.

According to that configuration, when a failure occurs in an interface in a storage device, the first optical module having the failure is switched to the second optical module, so that a storage device can keep on sending and receiving data to/from a host.

According to the present invention, a storage system and a optical module switching method for a storage system capable of, when a failure occurred in an interface in a storage device, continuing sending and receiving of data to/from a host can be provided.

Other aspects and advantages of the invention will be apparent from the following description and the appended claims.

BRIEF DESCRIPTION OF THE DRAWINGS

FIG. 10 is a diagram showing an example of an SFP threshold value table according to the first embodiment.

FIG. 11 is a diagram showing an example of a port threshold value table according to the first embodiment.

FIG. 12 is a diagram showing an example of an SFP information table according to the first embodiment.

FIG. 13 is a diagram showing an example of a port information table according to the first embodiment.

FIG. 14 is a diagram showing an example of a port group information table according to the first embodiment.

FIG. 15 is a diagram showing an example of a normal port information table according to the first embodiment.

FIG. 16 is a diagram showing an example of a backup port information table according to the first embodiment.

FIG. 21 is a diagram showing the configuration of a fiber unit in detail according to the second embodiment.

DETAILED DESCRIPTION OF PREFERRED EMBODIMENTS

An embodiment of the present invention will be described below with reference to the attached drawings.

First Embodiment

Figure 1:
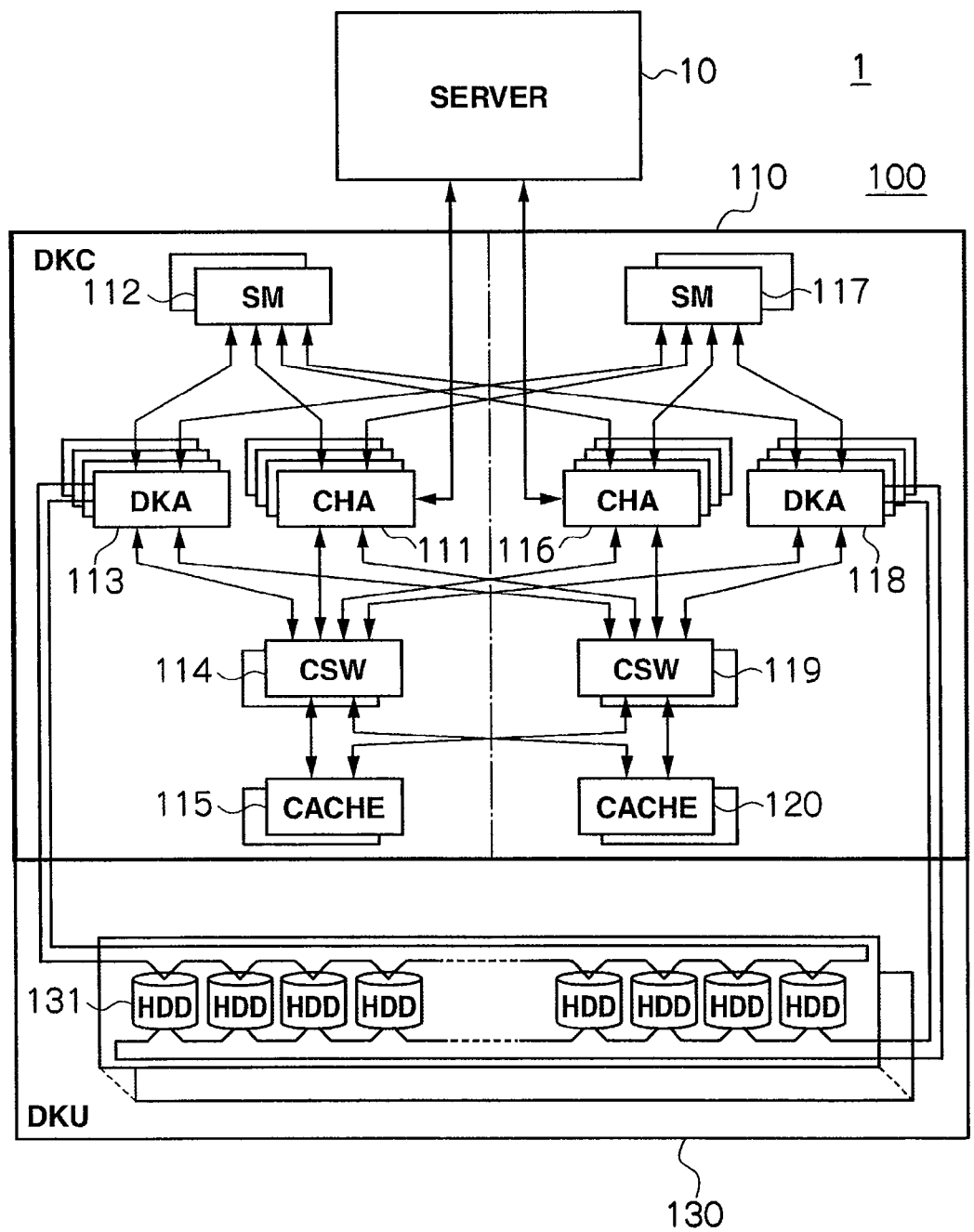
FIG. 1 is a diagram showing the configuration of a storage system according to a first embodiment of the invention.

First, a first embodiment will be described. FIG. 1 is a diagram showing the configuration of a storage system 1. The storage system 1 is configured to include a server 10 and a storage device 100. The server 10 and the storage device 100 are interconnected via a fiber cable.

The storage device 100 has a disk controller (DKC) 110 and a disk unit (DKU) 130. The disk controller 110 includes channel adaptors (CHA) 111, 116, shared memory (SM) 112, 117, disk adaptors (DKA) 113, 118, cache switches (CSW) 114, 119 and cache memory CACHE 115, 120.

The channel adaptor (CHA) 111, 116 controls sending and receiving data to/from the server 10. The shared memory (SM) 112, 117 stores various kinds of settings in the storage device 100, the various kinds of settings are used in the channel adaptors 111, 116, the disk adaptors 113, 118, etc. The disk adaptors (DKA) 113, 118 control sending and receiving of data to/from the disk unit 130. The cache switches (CSW) 114, 119 perform switching of the cache memory 115, 120. The cache memory CASHE 115, 120 temporarily holds data. Furthermore, the disk unit 130 includes more than one HDD 131. Data sent from the server 10 is held in these HDDs 131.

Incidentally, in this embodiment, the disk controller 110 is described as including two controllers, namely: a controller consisting of the channel adaptor 111, the shared memory 112, the disk adaptor 113, the cache switch 114 and the cache memory 115; and a controller consisting of the channel adaptor 116, the shared memory 117, the disk adaptor 118, the cache switch 119 and a controller consisting of the cache memory. It is not limited to this configuration, and the disk controller 110 may be configured to include one controller only.

Figure 2:
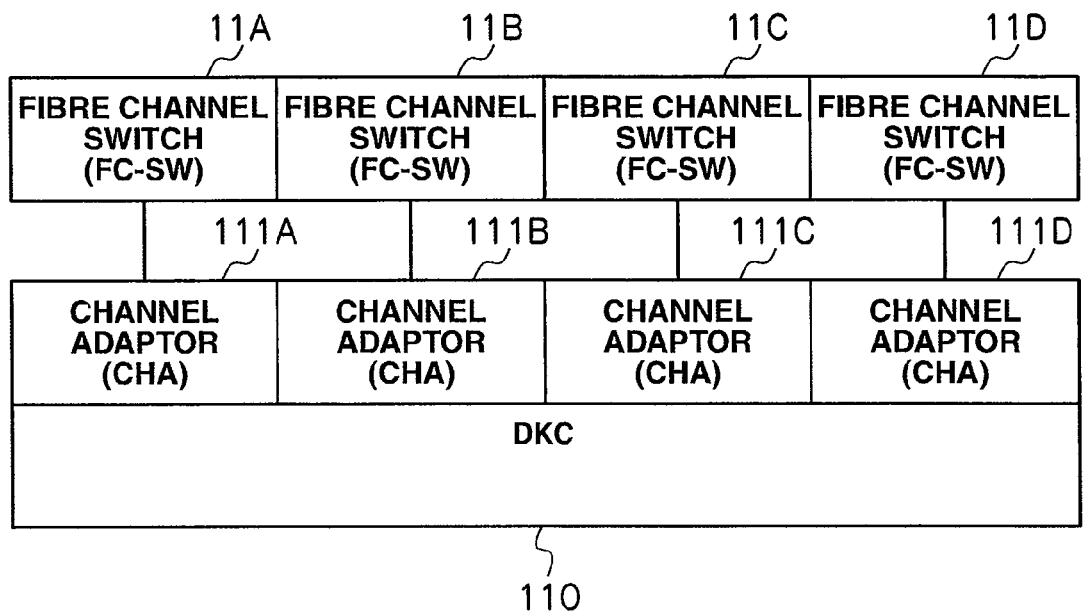
FIG. 2 is a diagram illustrating the configuration of the interface unit of a large-sized storage system according to the first embodiment.
Figure 3:
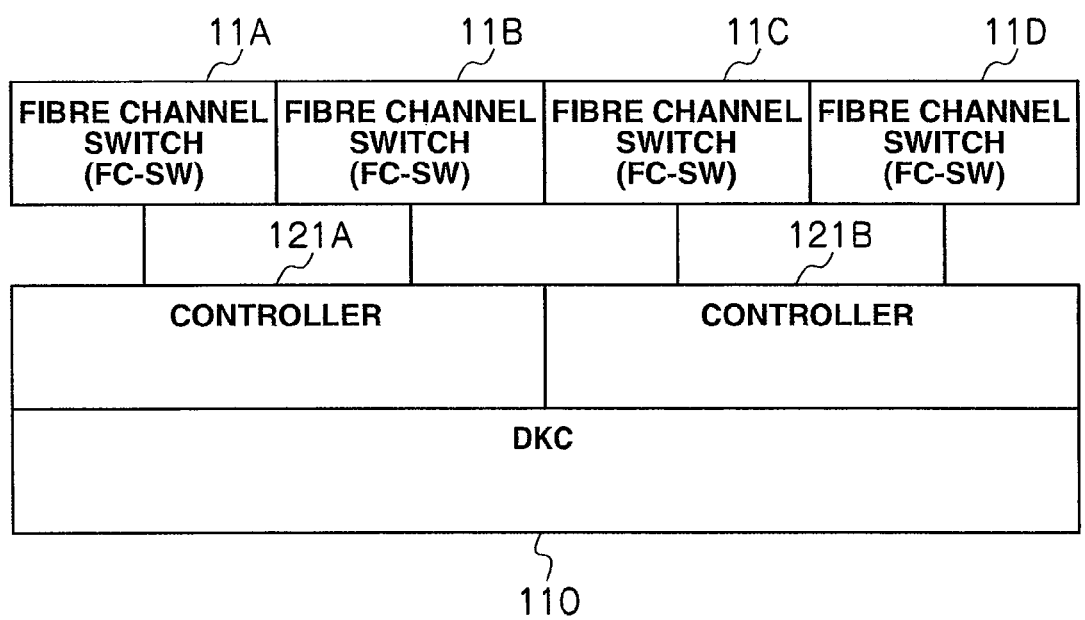
FIG. 3 is a diagram illustrating the configuration of the interface unit of a small-sized storage system according to the first embodiment.

FIG. 2 is a diagram for illustrating the configuration of an interface unit of the storage system 1. Fibre channel switches (FC-SW) 11A-11D in the server 10 and the channel adaptors 111A-111D in the disk controller 110 of the storage device 100 correspond one-to-one with each other. Incidentally, in this first embodiment, the channel adaptors 111A-111D installed in the disk controller 110 are configured as interfaces as shown in FIG. 2; however, an interface may be configured so that the fibre channel switches 11A-11D in the server 10 and controllers 121A, 121B in the disk controller 110 correspond to one another as shown in FIG. 3. The interface shown in FIG. 2 is, for example, installed in a large-sized disk subsystem device, and the interface shown in FIG. 3 is, for example, installed in a small-sized disk subsystem device.

Figure 4:
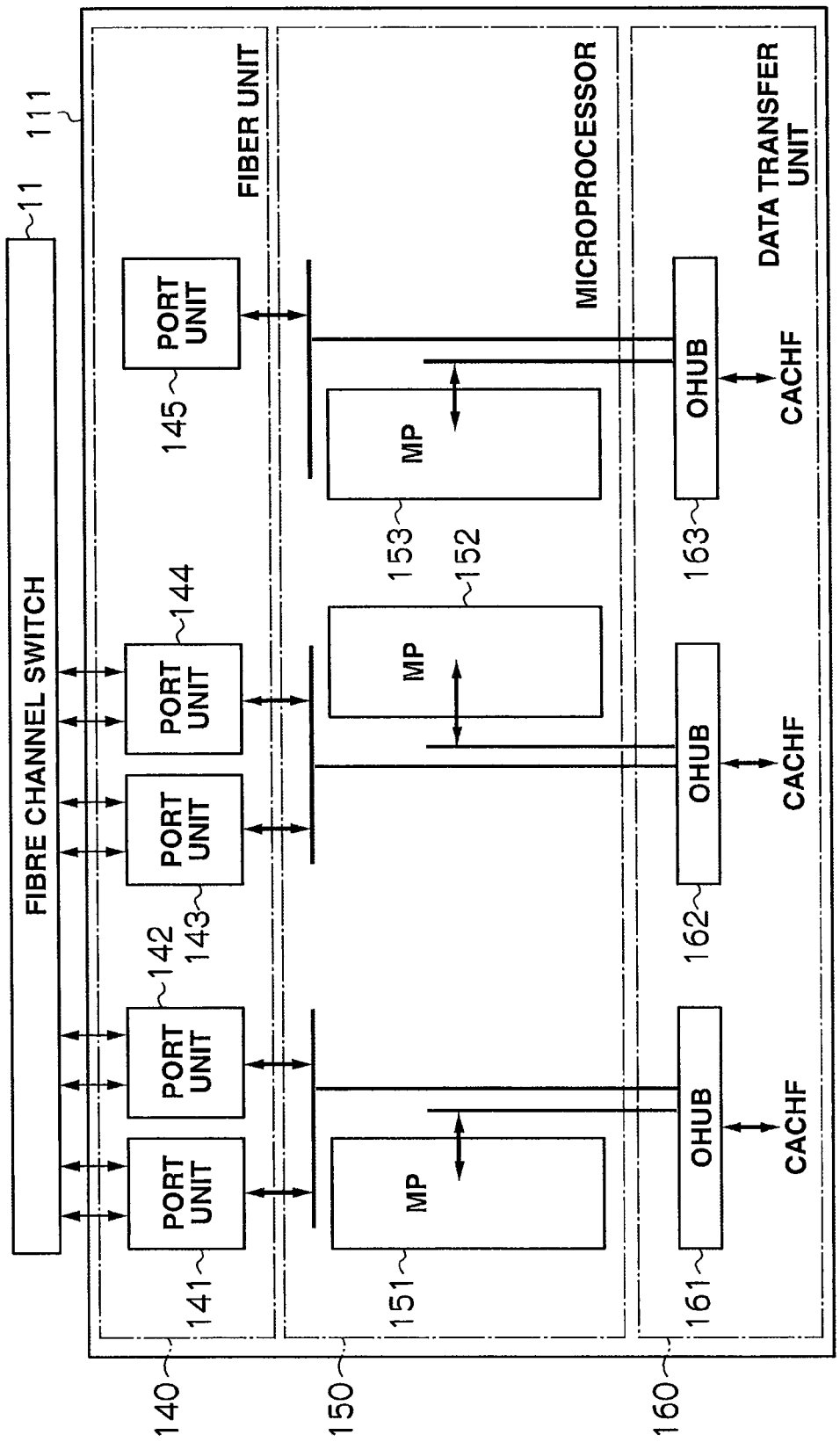
FIG. 4 is a block diagram showing the configuration of a channel adaptor according to the first embodiment.

FIG. 4 is a block diagram showing the configuration of the channel adaptor 111. The channel adaptor 111 includes a fiber unit 140, a microprocessor unit 150 and a data transfer unit 160.

The fiber unit 140 is a processing unit for performing processing for receiving data sent from a fibre channel switch 11 of the server 10. The fiber unit 140 includes port units 141, 142, 143 and 144 for receiving data via the fibre channel switch 11, and further includes a port unit 145. Hereinafter, ports A-H (ports A-H respectively correspond to SFPs-A171-178 described later below) in the port units 141, 142, 143 and 144 are referred to as "normal ports", because they correspond to the switch of the fibre channel switch 11; and port Z (corresponds to SFP-Z179 described later below) in the port unit 145 is a port used as a substitute for a normal port when an anomaly such as a failure, etc., occurs in a normal port, so it may be referred to as a "backup port."

The microprocessor unit 150 includes the microprocessors 151, 152 and 153. The microprocessors 151, 152 and 153 implement, in addition to processing for performing as the channel adaptor 111, error detect processing and port switching processing (the details of this processing will be described later below).

The data transfer unit 160 includes hubs (OHUB) 161, 162, 163. The hub 161 controls data transfer between the port units 141, 142, the microprocessor 151 and the cache memory 115. Also, the hub 162 controls data transfer between the port units 143, 144, the microprocessor 152 and the cache memory 115. Furthermore, the hub 163 controls data transfer between the port unit 145, the microprocessor 153 and the cache memory 115.

The configuration of the channel adaptor 111 is described with reference to FIG. 4, and the description of the channel adaptor 116 is substantially same as that of the channel adaptor 111, so the channel adaptor 116 will not be shown in figures, and its detailed description will be omitted.

Figure 5:
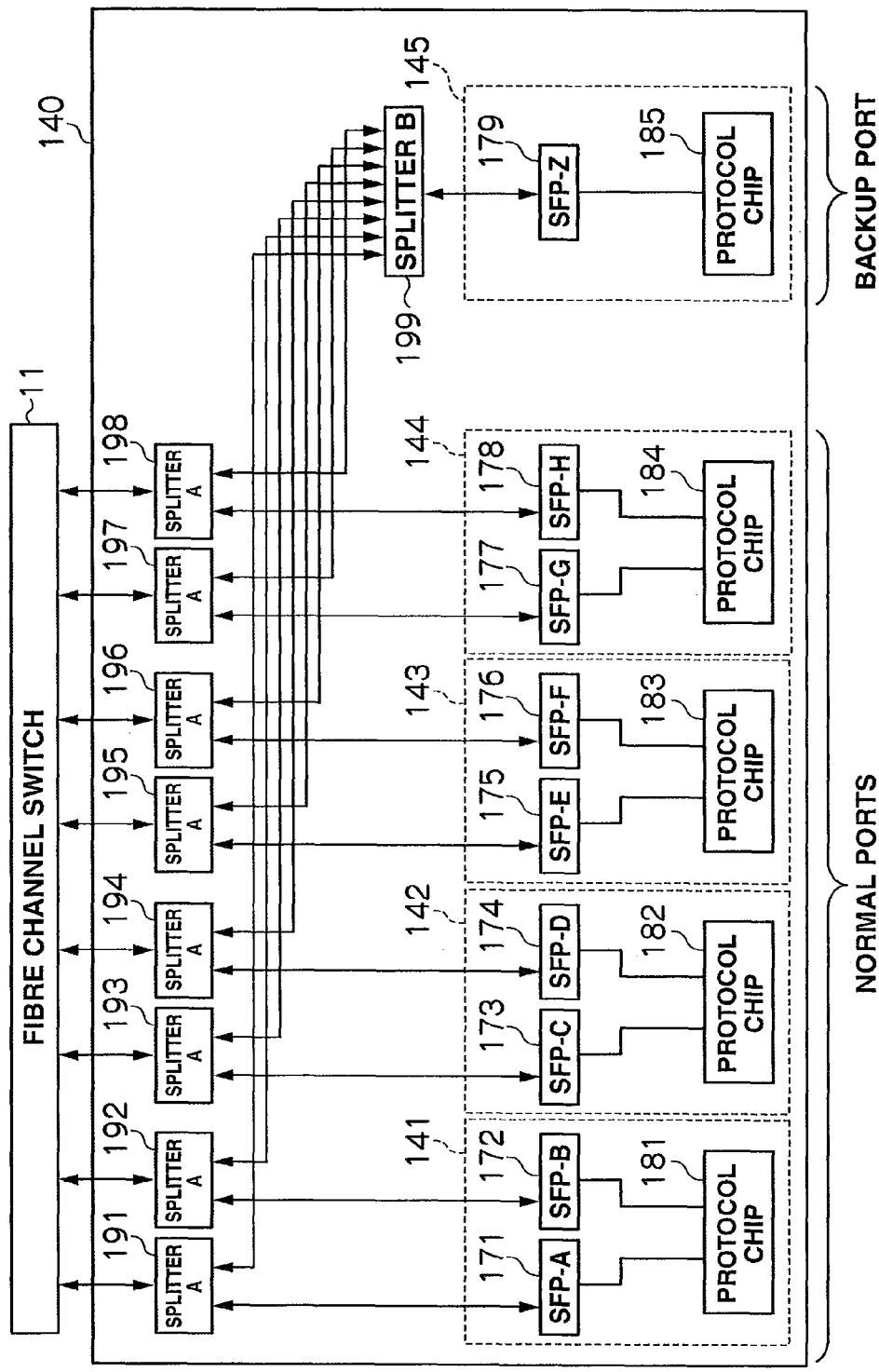
FIG. 5 is a diagram showing the configuration of a fiber unit in detail according to the first embodiment.

FIG. 5 is a diagram showing the configuration of the fiber unit 140 in detail. The fibre channel switch 11 and the fiber unit 140 are interconnected via splitters A 191-198. Specifically, the fiber unit 140 is configured to transfer data using eight paths. The port unit 141 includes an SFP-A171, SFP-B172 and a protocol chip 181; the port unit 142 includes an SFP-C173, SFP-D174 and a protocol chip 182; the port unit 143 includes an SFP-E175, SFP-F176 and a protocol chip 183; and the port unit 144 includes an SFP-G 177, SFP-H178 and a protocol chip 184. Also, the port unit 145 includes an SFP-Z179 and a protocol chip 185, and connects to the splitters A 191-198 via a splitter B 199.

The splitter A 191 and the SFP-A171, and the splitter A 192 and the SFP-B172 are respectively connected to one another, and the protocol chip 181 controls data transfer to/from the splitter A 191 and the splitter A 192 via the SFP-A171 and the SFP-B172. The splitter A 193 and the SFP-C173, and the splitter A 194 and the SFP-D174 are respectively connected to one another, and the protocol chip 182 controls data transfer to/from the splitter A 193 and the splitter A 194 via the SFP-C173 and the SFP-D174. The splitter A 195 and the SFP-E175, and the splitter A 196 and the SFP-F176 are respectively connected to one another, and the protocol chip 183 controls data transfer to/from the splitter A 195 and the splitter A 196 via the SFP-E175 and the SFP-F176. The splitter A 197 and the SFP-G177, and the splitter A 198 and the SFP-H178 are respectively connected to one another, and the protocol chip 184 controls data transfer to/from the splitter A 197 and the splitter A 198 via the SFP-G177 and the SFP-H178.

Figure 6:
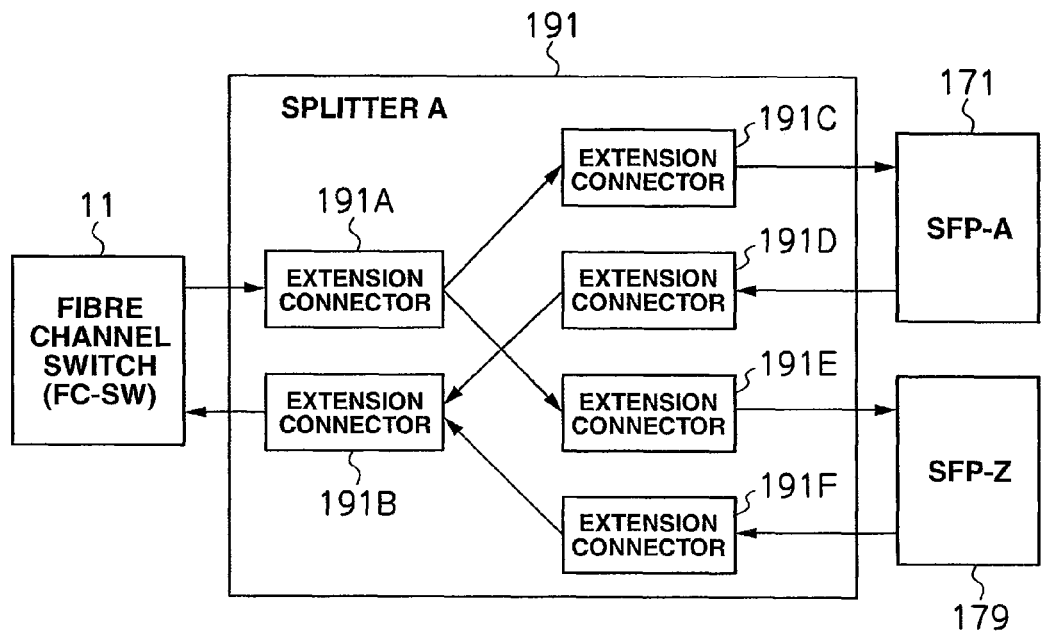
FIG. 6 is a block diagram showing the configuration of a splitter A according to the first embodiment.

Here, the configurations of the splitters A 191-198 and the splitter B 199 will be described. First, the splitters A 191-198 will be described. FIG. 6 is a block diagram showing the configuration of the splitter A 191.

As shown in FIG. 6, the fibre channel switch 11, the SFP-A171 and the SFP-Z179 are interconnected via extension connectors 191A-191F within the splitter A 191. Data received from the fibre channel switch 11 is input to the extension connectors 191C, 191E via the extension connector 191A, then the data is input from the extension connector 191C to the SFP-A171, and then from the extension connector 191E to the SFP-Z179. Meanwhile, data received respectively from the SFP-A171 and the SFP-Z179 are input to the extension connector 191B via the extension connector 191D, 191F, and then the data are input to the fibre channel switch 11.

The fibre channel switch 11, the extension connectors 191A-191F, the SFP-A171 and the SFP-Z179 are respectively interconnected via the fiber cable. Furthermore, the descriptions of the splitters A 192-198 are substantially same as that of the splitter A 191, so the splitters A 192-198 will not be shown in figures, and their detailed descriptions will be omitted.

Figure 7:
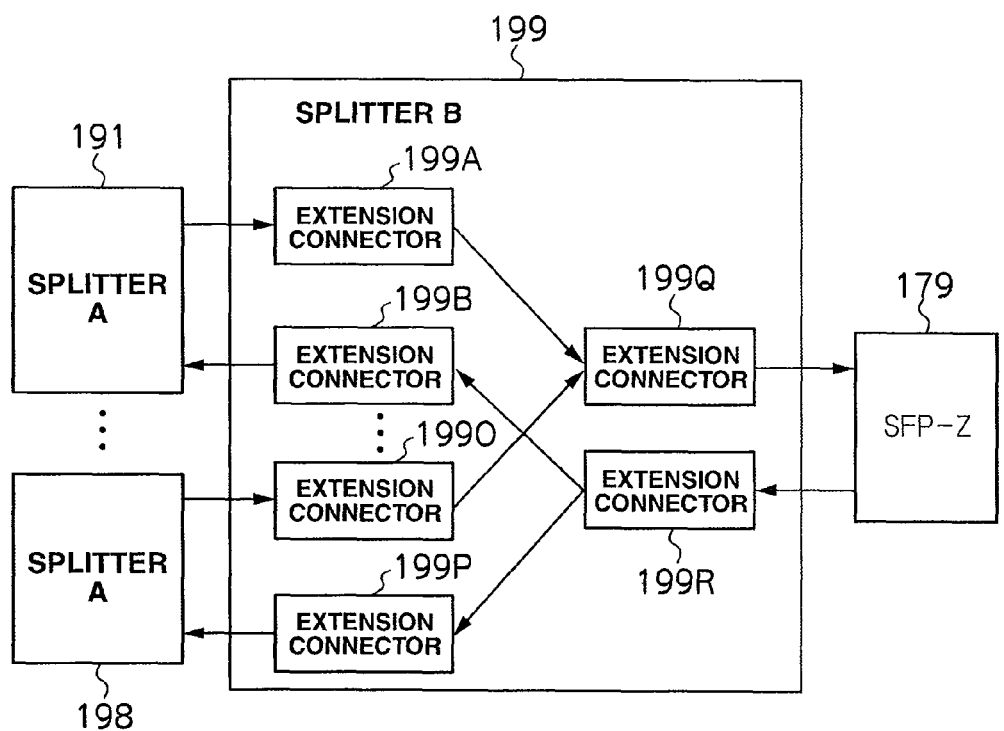
FIG. 7 is a block diagram showing the configuration of a splitter B according to the first embodiment.

Next, the splitter B 199 will be described. FIG. 7 is a block diagram showing the configuration of the splitter B 199. As shown in FIG. 7, the splitters A 191-198 and the SFP-Z179 are interconnected via the extension connectors 199A-199R within the splitter B 199. Data received from the splitter A 191 via the extension connector 199A is input to the SFP-Z179 via the extension connector 199Q. Data received from other splitters A via the extension connector is also input to the SFP-Z179 via the extension connector 199Q. Meanwhile, data received from the SFP-Z179 and the splitter B 199 via the extension connector 199R is input to the splitter A 191 via the extension connector 199B. Data input to other splitters A 192-198 are also input, in the same manner as in the splitter A 191, via the extension connector 199R and the extension connector that corresponds to the respective splitters A.

Figure 8:
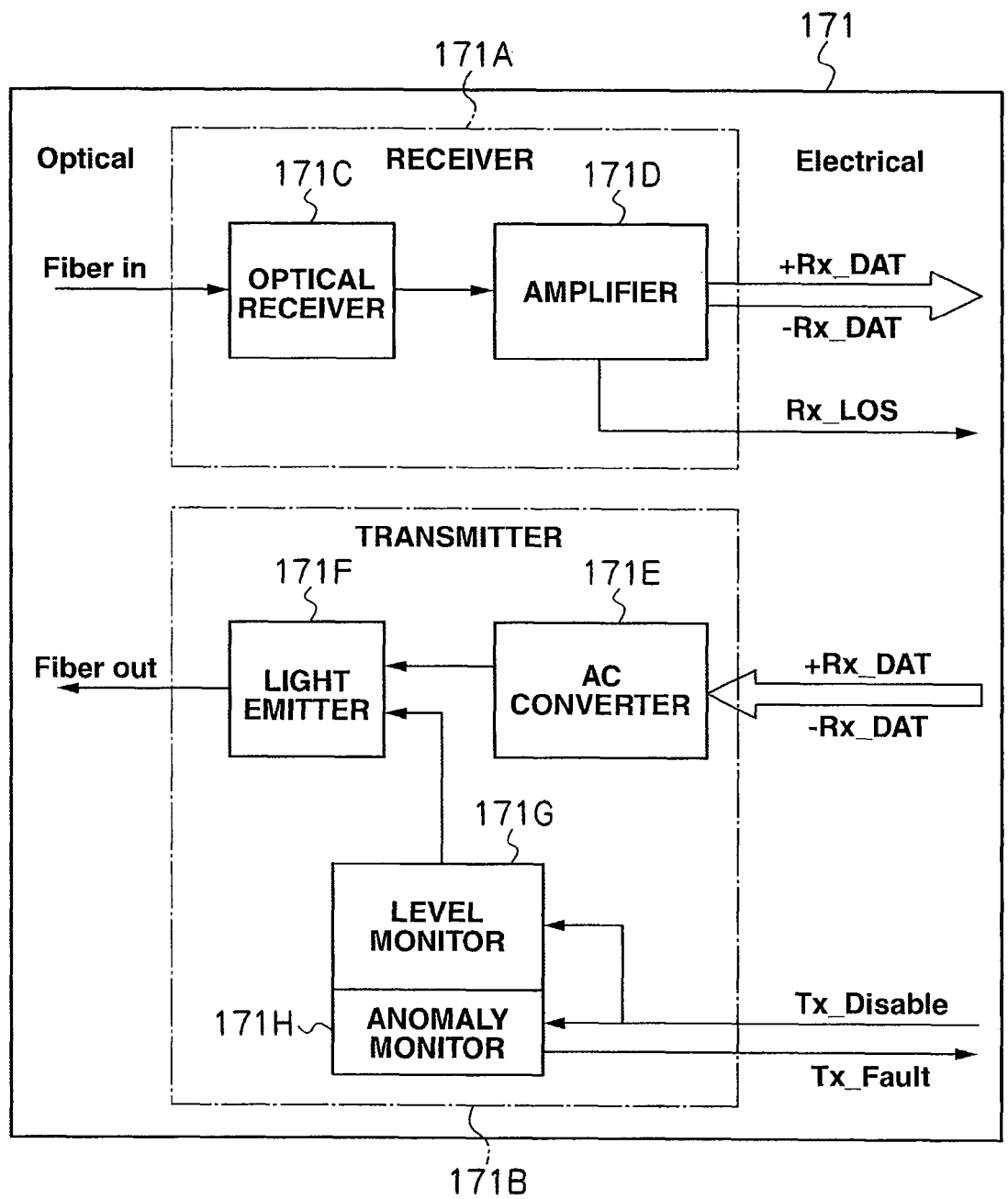
FIG. 8 is a block diagram showing the configuration of an optical module (SFP-A) according to the first embodiment.

The configuration of the SFP-A171 will be described next. FIG. 8 is a block diagram showing the configuration of the SFP-A171. SFP (Small Form factor Pluggable media) is an optical transceiver used in converting a signal between the fiber cable and the storage device. Incidentally, while the SFP is used in the first embodiment, for example, GBIC (Gigabit Interface Converter)/mini-GBIC or some similar optical modules may be used in place of the SFP-A171. More specifically, commonly-used optical modules may be used in place of the SFP-A171.

As shown in FIG. 8, the SFP-A171 includes a receiver 171A and a transmitter 171B. The receiver 171A receives data from the fibre channel switch 11 via the fiber cable, and transmits data to the protocol chip 181. The transmitter 171B transmits data received from the protocol chip 181 to the fibre channel switch 11 via the fiber cable. In FIG. 8, the fibre channel switch 11 and the protocol chip 181 are not shown. The details of the receiver 171A and the transmitter 171B will be described below.

The receiver 171A includes an optical receiver 171C and an amplifier 171D. The optical receiver 171C converts an optical signal, which is received from the fibre channel switch 11 via the fiber cable, to an electric signal. The amplifier 171D amplifies the electric signal converted in the optical receiver 171C, and transmits it to the protocol chip 181. Meanwhile, the transmitter 171B includes an AC converter 171E, a light emitter 171F, a level monitor 171G and an anomaly monitor 171H. The AC converter 171E converts an electric signal sent from the protocol chip 181 to an optic element. The light emitter 171F outputs, based on the optic element converted in the AC converter 171E, a laser to the fibre channel switch 11 via the fiber cable. The level monitor 171G monitors the level of the laser output from the light emitter 171F. When the anomaly monitor 171H detects any value other than the values at a predetermined level, it sends an anomaly status to the protocol chip 181. Then, when the level monitor 171G and the anomaly monitor 171H receive a signal for cutting off the laser in response to the anomaly status sent from the protocol chip 181, the light emitter 171F stops outputting the laser.

The descriptions of the SFPs-B172-Z179 are substantially same as those of the SFP-A171, so the SFPs-B172-Z179 will not be shown in figures, and their detailed descriptions will be omitted.

Figure 9:
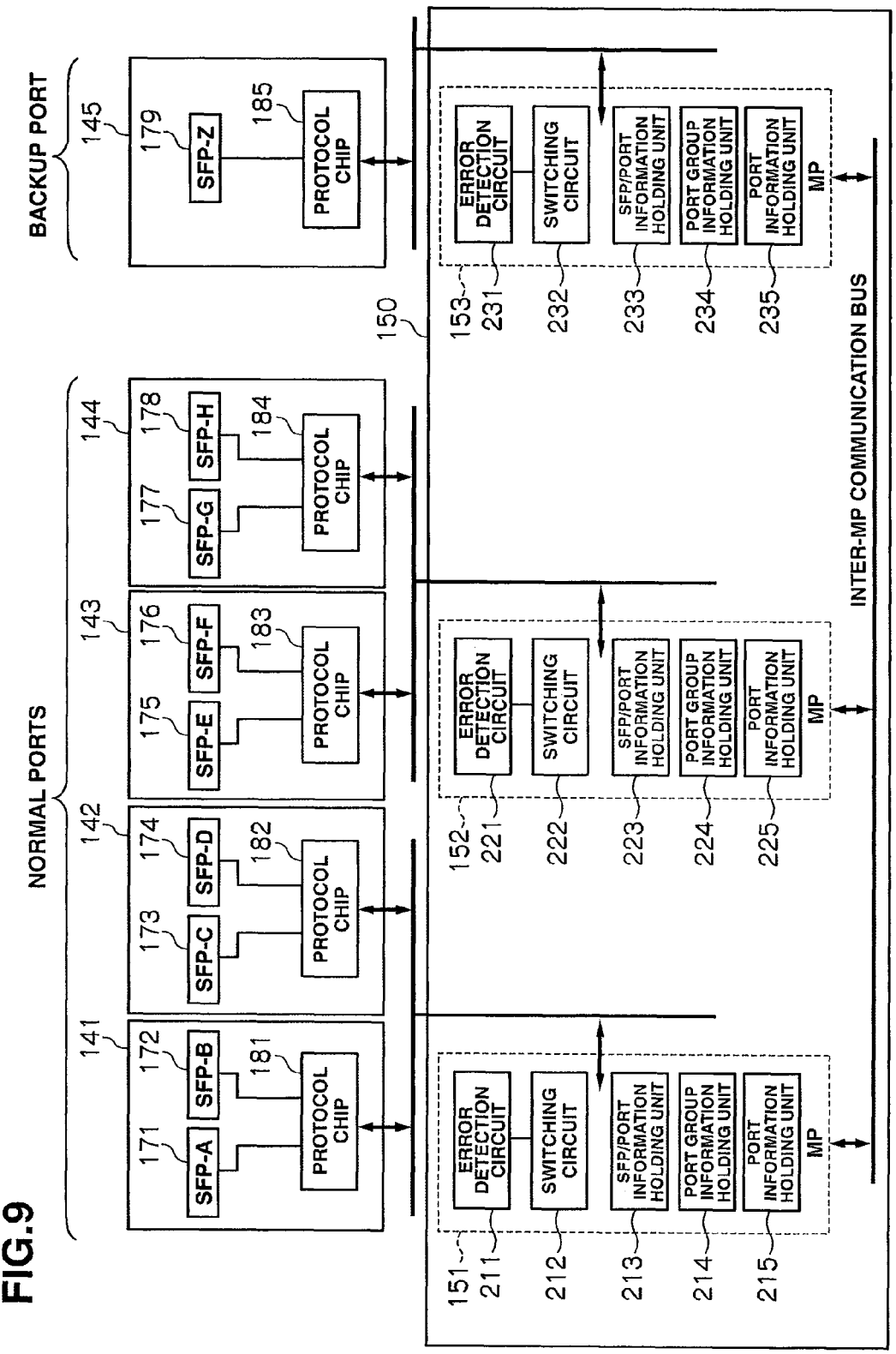
FIG. 9 is a diagram showing the configuration of a microprocessor unit in detail according to the first embodiment.

FIG. 9 is a diagram showing the configuration of the microprocessor unit 150 in detail. The port units 141-145 are shown in FIG. 9, and their descriptions are the same as that in FIG. 5, so their detailed descriptions will be omitted. The microprocessor unit 150 will be described below.

As shown in FIG. 9, the microprocessor unit 150 includes the microprocessors 151-153. The microprocessor 151 connects to the port units 141, 142 via a bus line. Also, the microprocessor 152 connects to the port units 143, 144 via the bus line. Furthermore, the microprocessor 153 connects to the port unit 145 via the bus line. Respective microprocessors 151-153 are interconnected via an inter-microprocessor communication bus and are capable of communication with one another, so they can share information that the microprocessors 151-153 respectively hold.

The microprocessor 151 includes an error detection circuit 211, a switching circuit 212, an SFP/port information holding unit 213, a port group information holding unit 214 and a port information holding unit 215. Incidentally, while the functions of the error detection circuit 211 and the switching circuit 212 are respectively implemented in software in the first embodiment, naturally, they may be implemented in hardware.

The error detection circuit 211 performs processing for detecting errors in the port units 141, 142 and the SFPs-A171-D174. The switching circuit 212 performs processing for switching the normal ports (the port units 141-144) and the backup port (the port unit 145). The SFP/port information holding unit 213 holds an SFP information table showing the statuses of the SFPs-A171-Z179l and a port information table showing the statuses of the port units 141-145. The port group information holding unit 214 holds a port group table showing that the normal ports and the backup port are grouped. The port information holding unit 215 holds a port information table for storing the setting information on the normal ports and the backup port.

The microprocessors 152, 153 have the same configuration as that of the microprocessor 151, and they respectively include error detection circuits 221, 231, switching circuits 222 232, SFP/port information holding units 223, 233, port group information holding units 224, 234 and port information holding units 225, 235. Their detailed descriptions are the same as that of the microprocessor 151, so they will be omitted.

Next, an SFP threshold value table 300, which holds threshold values used in the error detection circuit 211 to judge whether or not there is an error in the respective SFPs-A171-D174 will be described. This SFP threshold value table 300 is held in memory (not shown) within the microprocessor 151. FIG. 10 is a diagram showing an example of the SFP threshold value table 300.

As shown in FIG. 10, the SFP threshold value table 300 includes, a "monitoring item" column 310 for storing monitoring items and a "THRESHOLD VALUE" column 320 for storing threshold values. The "MONITORING ITEM" column 310 is provided with: a "TEMPERATURE (TEMPERATURE)" column 331 for monitoring the respective temperature of the SFP-A171-D179; a "CURRENT (CURRENT)" column 332 for monitoring currents; a "VOLTAGE (VOLTAGE)" column 333 for monitoring voltages, an "OPTICAL RECEIVING POWER (RX POWER)" column 334 for monitoring optical receiving power and a "LIGHT EMITTING POWER (TX POWER)" column 335 for monitoring light emitting power. The units of information respectively stored in temperature column 331, current column 332, voltage column 333, the "OPTICAL RECEIVING POWER" column 334 and the "LIGHT EMITTING POWER" column 335 are as follows: the unit for temperature is "Centigrade"; the unit for current is "mAmps"; the unit for voltage is "mVolts"; the unit for optical receiving power is "uWatts"; and the unit for light emitting power is "uWatts". In the "THRESHOLD VALUE" column 320, the respective threshold values for temperature, current, voltage, optical receiving power and light emitting power are stored in each corresponding "TEMPERATURE" column 331, "CURRENT" column 332, "VOLTAGE" column 333, "OPTICAL RECEIVING POWER" column 334 and "LIGHT EMITTING POWER" column 335. Also, "−20~85" indicating threshold value for temperature, "0~20" indicating the threshold value for current, "3000~3600" indicating the threshold value for voltage, "158~1000" indicating the threshold value for optical receiving power and "126~562" indicating the threshold value for light emitting power are respectively stored in the "THRESHOLD VALUE" column 320. Moreover, the threshold values stored in the SFP threshold value table 300 shown in FIG. 10 are merely examples, and the values for the threshold values are not limited to these values.

Next, a port threshold value table 400, which holds a threshold value for the error detection circuit 211 to judge whether or not there is an error in the respective ports A-D will be described. This port threshold value table 400 is held in memory (not show) within the microprocessor 151. FIG. 11 is a diagram showing an example of the port threshold value table 400. The error detection circuit 211 counts the number of errors detected in the respective ports A-D, and monitors whether or not the number of errors exceeds a threshold value.

As shown in FIG. 11, the port threshold value table 400 includes a "MONITORING ITEM" column 410 for storing monitoring items and a "THRESHOLD VALUE" column 420. The "MONITORING ITEM" column 420 includes an "enc in" column 431, an "enc out" column 432, a "crc error" column 433, a "too shrt" column 434, a "too long" column 435, a "bad eof" column 436, a "disk c3" column 437, a "link fail" column 438, a "loss sync" column 439, a "loss sig" column 440, an "frjt" column 441 and an "fbsy" column 442.

The "enc in" stored in the "enc in" column 431 is an encoding error within a frame. The "enc out" stored in the "enc out" column 432 is an encoding error outside a frame. The "crc error" stored in the "crc error" column 433 indicates an error on a CRC (Cyclic Redundancy Check). CRC means a cyclic redundancy check, and is one of the methods for checking, when transferring data, whether or not data was correctly transferred. The "too shrt" stored in the "too shrt" column 434 indicates a frame shorter than the minimum frame length. The "too long" stored in the "too long" column 435 indicates a frame longer than the maximum frame length. The "bad eof" stored in the "bad eof" column 436 indicates the delimiter frame of a bad end-of-frame. The "disk c3" stored in the "disk c3" column 437 indicates the discarded frame in class 3. The "link fail" stored in the "link fail" column 438 indicates a link failed (LF1 or LF2 state). The "loss sync" stored in the "loss sync" column 439 indicates that synchronization failed. The "loss sig" stored in the "loss sig" column 440 indicates a signal loss. The "frjt" stored in the "frjt" column 441 indicates a frame rejected by "Fabric Reject" (rejected frame: a frame in Fiber-standard (Class-F)). The "fbsy" stored in the "fbsy" column 442 indicates a frame busy by "Fabric busy" (busy frame: a frame in Fiber-standard (Class-F)).

In the "THRESHOLD VALUE" column 420, for example, "1", "1", "1", "1", "1", "1", "1", "4", "4", "4", "1" and "1" are stored in correspondence with the respective columns, namely the "enc in" column 431, the "enc out" column 432, the "crc error" column 433, the "too shrt" column 434, the "too long" column 435, the "bad eof" column 436, the "disk c3" column 437, the "link fail" column 438, the "loss sync" column 439, the "loss sig" column 440, the "frjt" column 441 and the "fbsy" column 442. Incidentally, the threshold value set in the port threshold value table 400 shown in FIG. 11 is merely an example, so the threshold value is not limited to these values.

Tables storing threshold values similar to those in the above described SFP threshold value table 300 and port threshold value table 400 will be used in the error detection circuits 221, 231.

FIG. 12 is a diagram showing an example of the SFP information table 500. The SFP information table 500 is a table created in the SFP/port information holding unit 213 in the microprocessor 151. The SFP information table 500 is a table for storing the status of the temperature, current, voltage, optical receiving power and light emitting power of the respective SFPs-A171-179. As will be described later below, the respective microprocessors 151-153 are interconnected via the inter-microprocessor communication bus, so they communicate with one another and retrieve information on the SFP, so that they can store the status of all the SFPs-A 171-179 in the SFP information table 500. Accordingly, the SFP information table 500 storing the same content as the SFP information table 500 in the SFP/port information holding unit 213 is created in the SFP/port information holding units 223, 233 in the microprocessors 152, 153.

As shown in FIG. 12, the SFP information table 500 includes the "TEMPERATURE" column 501, the "CURRENT" column 502, the "VOLTAGE" column 503, the "OPTICAL RECEIVING POWER" column 504, the "LIGHT EMITTING POWER" column 505 respectively corresponding to the SFPs-A171-Z179. Accordingly, with respect to each of the SFPs-A171-Z179, temperatures are created in the "TEMPERATURE" column 501, current values are created in the "CURRENT" column 502, voltage values are created in the "VOLTAGE" column 503, optical receiving power values are created in the "OPTICAL RECEIVING POWER" column 504, and light emitting power values are created in the "LIGHT EMITTING POWER" column 505. For example, "60" is stored in the "TEMPERATURE" column 501, "10" is stored in the "CURRENT" column 502, "33000" is stored in the "VOLTAGE" column 503, "500" is stored in the "OPTICAL RECEIVING POWER" column 504, and "300" is stored in the "LIGHT EMITTING POWER" column 505, in which all the columns correspond to the SFP-A171.

FIG. 13 is a diagram showing an example of the port information table 600. The port information table 600 is a table created in the SFP/port information holding unit 213 in the microprocessor 151, and is a table for counting errors that occur in the respective ports A-H and the port Z. The respective microprocessors 151-153 are interconnected, as described above, via the inter-microprocessor communication bus, so they communicate with one another and retrieve information on the ports, so that they store the status of all the ports A-H and the port Z in the port information table 600. Accordingly, the port information table 600 storing the same content as the port information table 600 in the SFP/port information holding unit 213 is created in the SFP/port information holding units 223, 233 in the microprocessors 152, 153.

As shown in FIG. 13, the port information table 600 includes the "enc in" column 601, the "enc out" column 602, the "crc error" column 603, the "too shrt" column 604, the "too long" column 605, the "bad eof" column 606, the "disk C3" column 607, the "link fail" column 608, the "loss sync" column 609, "loss sig" column 610, the "frjt" column 611 and the "fbsy" column 612 respectively corresponding to the ports A-H and the port Z. Accordingly, with respect to the ports A-H and the port Z, the numbers of errors are respectively stored in the "enc in" column 601, the "enc out" column 602, the "crc error" column 603, the "too shrt" column 604, the "too long" column 605, the "bad eof" column 606, the "disk C3" column 607, "link fail" column 608, the "loss sync" column 609, the "loss sig" column 610, "frjt" column 611 and the "fbsy" column 612. For example, "0" is stored in the "enc in" column 601, "0" is stored in the "enc out" column 602, "0" is stored in the "crc error" column 603, "0" is stored in the "too shrt" column 604, "0" is stored in the "too long" column 605, "0" is stored in the "bad eof" column 606, "0" is stored in the "disk C3" column 607, "1" is stored in the "link fail" column 608, "2" is stored in the "loss sync" column 609, "1" is stored in the "loss sig" column 610, "0" is stored in the "frjt" column 611, and "0" is stored in the "fbsy" column 612, in which all the columns correspond to the port A.

FIG. 14 is a diagram showing an example of a port group information table 700. Port group information stored in the port group information table 700 is information indicating the relationships in which the normal ports and the backup ports are grouped. In order to set a port group, an option bit (a flag) is set in each normal port, and the option bit is "ON" as necessary when installing the storage system 1, etc. For example, a user, etc., will set the flag by means of the port setting screen of the existing maintenance terminal unit of the storage device 100. Processing for switching to the backup port when a failure occurs will not be performed on the normal port in which the flag is not "ON". This switch processing will be described later below with reference to FIGS. 19 and 20. Thus, the port group information table 700 is provided so that a user, etc., can select, when a failure occurs in normal ports, whether or not data communications should be continued by switching to a backup port.

As shown in FIG. 14, flags can be set in the port group information table 700, in which the flags are for grouping the respective ports A-H and port Z. An "ON" flag indicates that the port is grouped, and an "OFF" flag indicates that the port is not grouped. In the default state, "OFF" flags are set for all ports.

FIG. 15 is a diagram showing an example of a normal port information table 800. The normal port information table 800 is a table for managing setting information on the ports A-H (the normal ports). The normal port information table 800 is kept in memory (not shown) in the respective microprocessors 151-153.

As shown in FIG. 15, the normal port information table 800 includes a "HOST MODE" column 810 and a "PORT PARAMETER" column 820. The "HOST MODE" column 810 stores, for each of the ports A-H, each kind of operation system installed in a host connected to the ports. The "HOST MODE" column 810 includes, for the kinds of operation systems, an "HP-UX" column 811, an "AIX" column 812, a "Solaris" column 813, an "Windows" column 814 and an "OTHERS" column 815. A column which corresponds to the relevant operation system will be flagged. Furthermore, the "PORT PARAMETER" column 820 includes an "Address" column 821, a "Fabric" column 822, a "Connection" column 823 and a "Channel Speed" column 824. Addresses, fabrics, connections and channel speeds that are respectively set for the ports A-H are respectively stored the "Address" column 821, the "Fabric" column 822, the "Connection" column 823 and the "Channel Speed" column 824.

FIG. 16 is a diagram showing an example of a backup port information table 900. The backup port information table 900 is a table for storing information on the port Z, which is used as an back up when a failure occurs. Therefore, the backup port information table 900 includes areas for reserving the content in the normal port information table 800. When switching normal/backup ports, information stored in the normal port information table 800 or information on the port to be switched is copied to the backup port information table 900.

As shown in FIG. 16, the backup port information table 900 includes, as the normal port information table 800 does, the "HOST MODE" column 810 and the "PORT PARAMETER" column 802 for each of the ports A-H. The content of the information stored in the "HOST MODE" column 810 and the "PORT PARAMETER" column 802 are the same, except for reference numerals, as that in the backup port information table 800, so a description will be omitted.

Next, processing executed by the error detection circuit 211 in the microprocessor 151 will be described. The error detection circuit 211 executes SFP threshold value monitor processing for monitoring the threshold values of the SFP-A171-SFP-H174 and port threshold value monitor processing for monitoring the threshold values of the ports A-H.

Figure 17:
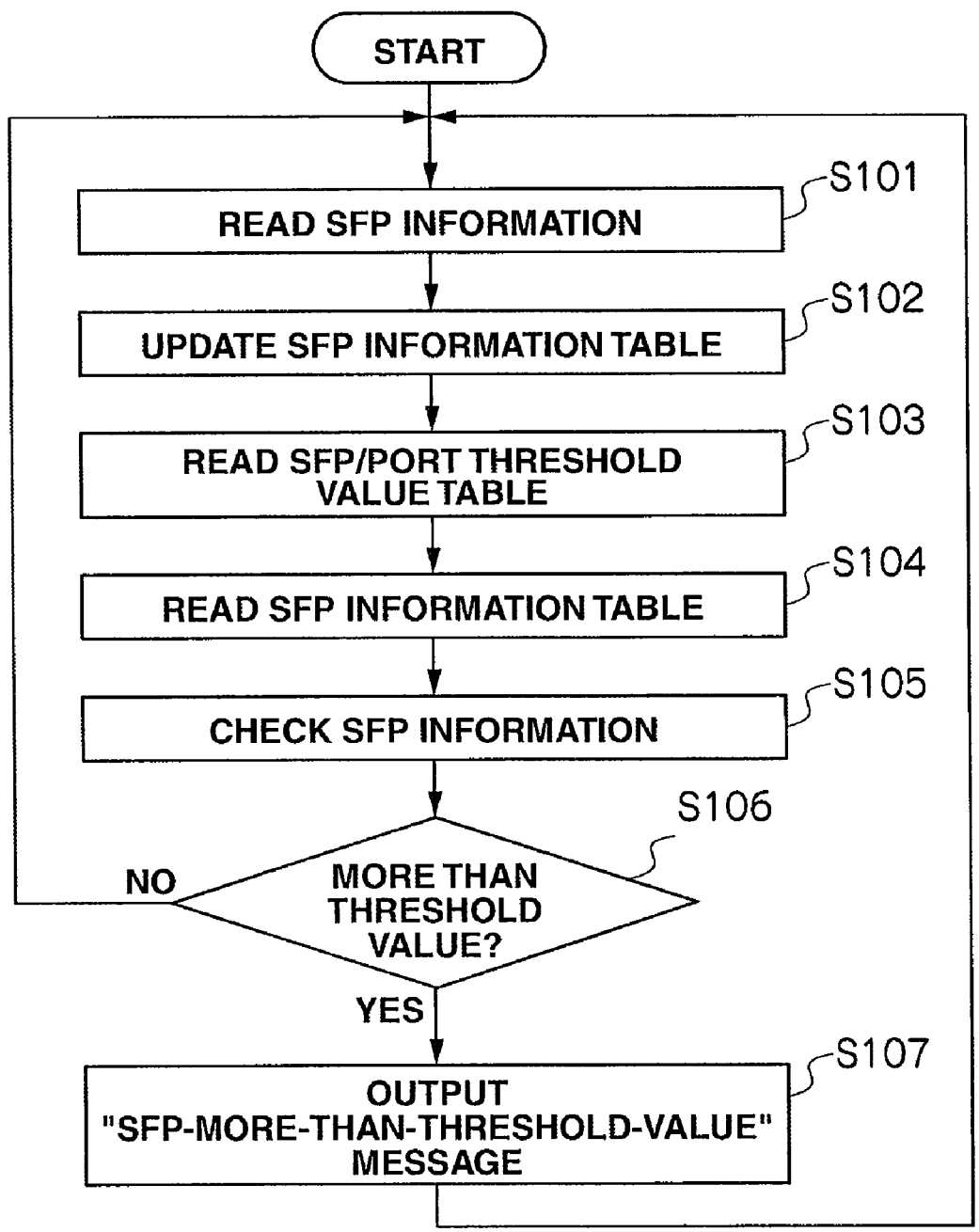
FIG. 17 is a flowchart illustrating SFP threshold value monitor processing according to the first embodiment.

The SFP threshold value monitor processing for monitoring SFP threshold values will be described. FIG. 17 is a flowchart illustrating the SFP threshold value monitor processing. The SFP threshold value monitor processing is executed at all times, after the storage device 100 is powered on.

First, in step S101, the error detection circuit 211 reads information held in the SFPs-A171-D174. Then in step S102, the error detection circuit 211 updates the SFP information table 500, based on the read information. Next, in step S103, the error detection circuit 211 reads threshold values stored in the SFP threshold value table 300 from the memory in the microprocessor 151. Then in step S104, the error detection circuit 211 reads information stored in the SFP information table 500 of the SFP/port information holding unit 213.

In step S105, the error detection circuit 211 performs an SFP information check. This check is performed by comparing the content of the SFP threshold value table 300 read in step S103 with the content of the SFP information table 500 read in step S104, and checking whether or not there is one whose value is more than the corresponding threshold value.

Then in step S106, the error detection circuit 211 judges whether or not there is any SFP of the SFP-A171-SFP-D174 whose value is more than the corresponding threshold value, based on the check result in step S105. If there is an SFP whose value is more than the corresponding threshold value (S106: YES), then in step S107, the error detection circuit 211 outputs a "SFP-more-than-threshold-value" message to a log within the microprocessor 151. Accordingly, after the "SFP-more-than-threshold-value" message is output, or if there is no SFP whose value is more than the corresponding threshold value in step S106 (S106: NO), the error detection circuit 211 returns to step S101, and repeats the steps described above.

Figure 18:
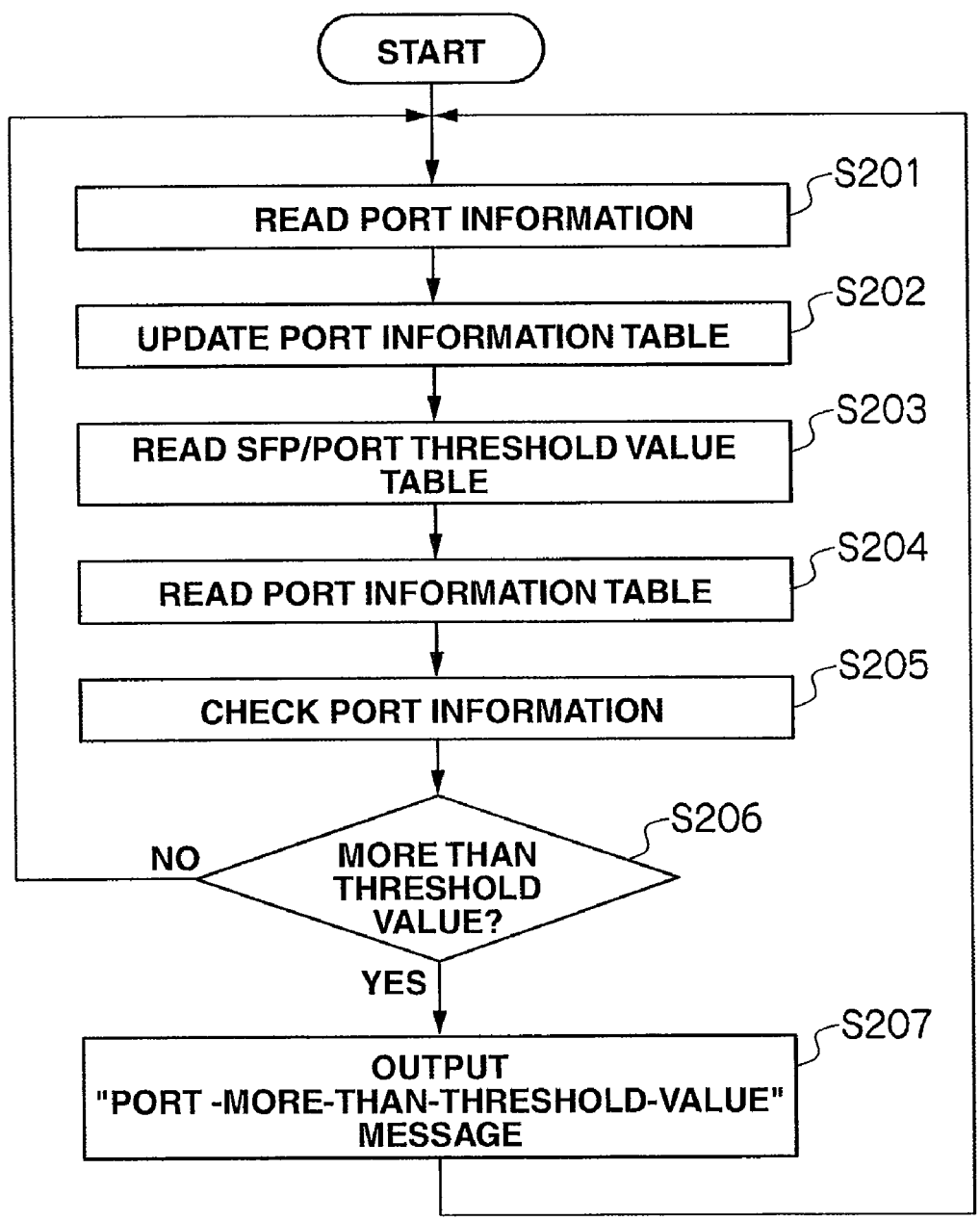
FIG. 18 is a flowchart illustrating port threshold value monitor processing according to the first embodiment.

Next, port threshold value monitor processing for monitoring port threshold values will be described. FIG. 18 is a flowchart illustrating the port threshold value monitor processing. The port threshold value monitor processing is executed at all times, after the storage device 100 is powered on.

First, in step S201, the error detection circuit 211 reads information held in the ports A-D. Then in step S202, the error detection circuit 211 updates the port information table 600, based on the read information. Next, in step S203, the error detection circuit 211 reads information stored in the port threshold value table 400 from memory in the microprocessor 151. Then in step S104, the error detection circuit 211 reads information stored in the port information table 600 of the SFP/port information holding unit 213.

In step S205, the error detection circuit 211 performs a port information check. This check is performed by comparing the content of the port threshold value table 400 read in step S203 with the content of the port information table 600 read in step S204, and checking whether or not there is any port whose value is more than a corresponding threshold value.

Then in step S206, the error detection circuit 211 judges whether or not there is any port, out of the ports A-D, with a value more than the corresponding threshold value, based on the check result in step S205. If there is a port whose value is more than the corresponding threshold value (S206: YES), then in step S207, the error detection circuit 211 outputs a "port-more-than-threshold-value" message to a log within the microprocessor 151. Accordingly, after the "port-more-than-threshold-value" message is output, or if there is no port whose value is more than the corresponding threshold value in step S206 (S206: NO), the error detection circuit 211 returns to step S201, and repeats the steps described above.

The error detection circuits 221, 231 also execute substantially the same processing as the processing executed by the error detection circuit 211 described with reference to FIGS. 17 and 18. Thus, processing for constantly monitoring the status of the ports A-H and the port Z and the status of the SFPs-A171-H178 and SFP-Z179 is executed so that the status of the ports A-H and the port Z and the status of the SFPs-A171-H178 and SFP-Z179 can be accurately assessed.

Figure 19:
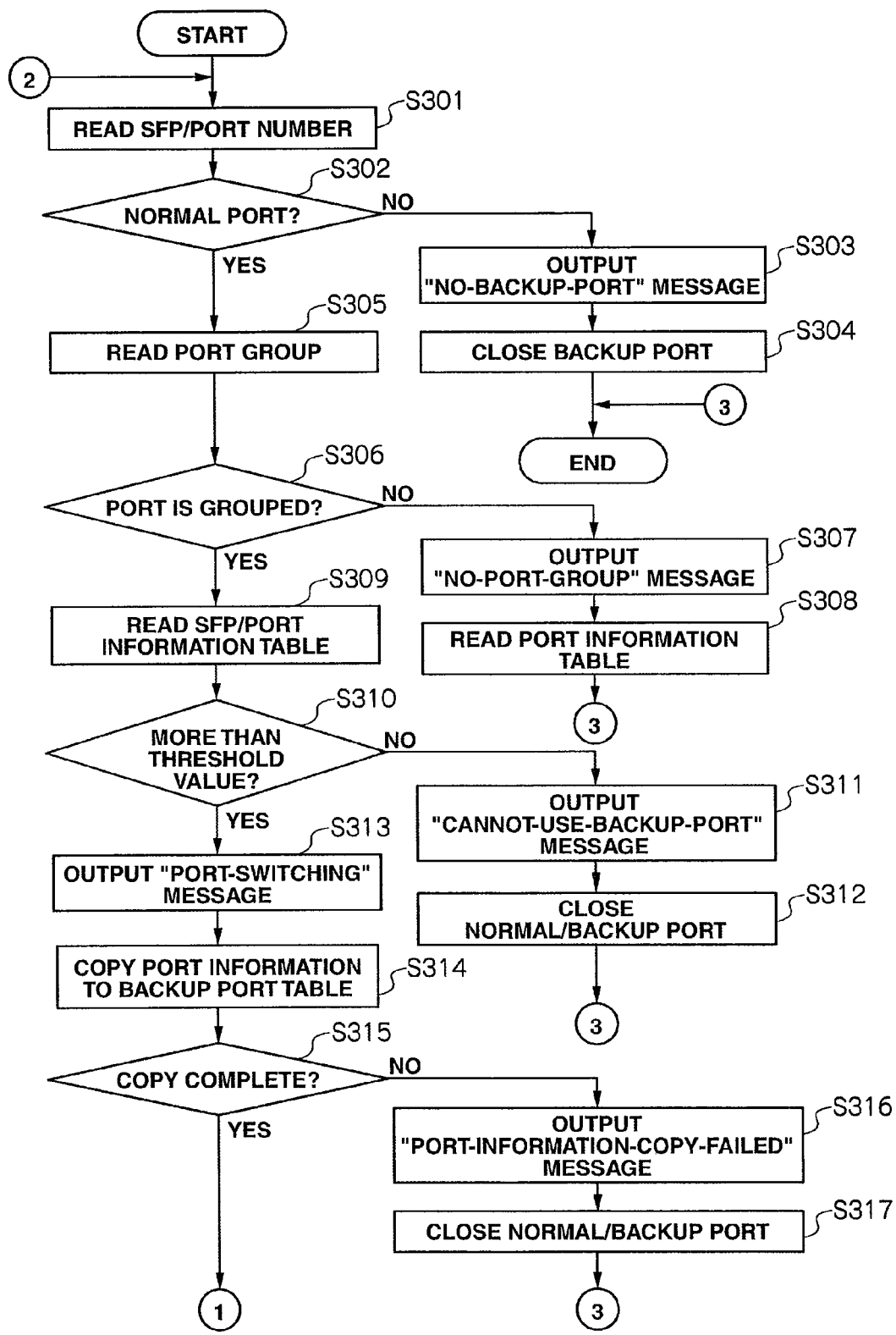
FIG. 19 is a flowchart illustrating the first half of port switching processing according to the first embodiment.
Figure 20:
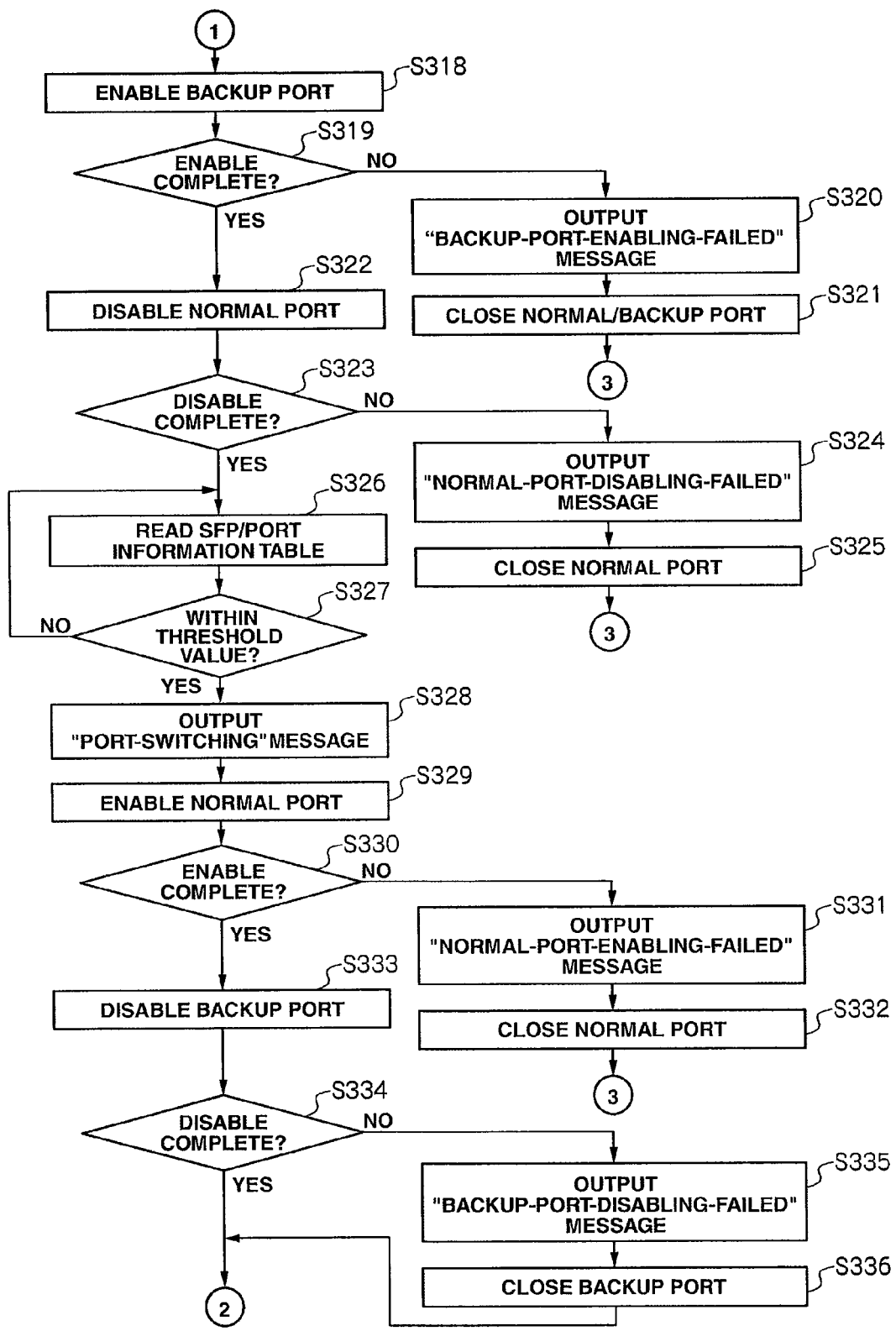
FIG. 20 is a flowchart illustrating the latter half of port switching processing according to the first embodiment.

Next, processing executed by the switching circuit 212 for switching SFPs (ports) will be described, and this processing is executed when a "SFP-more-than-threshold-value" message or a "port-more-than-threshold-value" message is output to a log within the microprocessor 151. FIGS. 19 and 20 are flowcharts illustrating processing executed by the switching circuit 212. Incidentally, FIG. 19 illustrates the first half of the aforementioned processing, while FIG. 20 illustrates the latter half.

First, in step S301, a "SFP-more-than-threshold-value" or "port-more-than-threshold-value" message is output to a log within the microprocessor 151, then the switching circuit 212 reads numbers from the SFP information table 300 and the port information table 400 with respect to the SFPs or ports that correspond to the aforementioned message.

Then in step S302, the switching circuit 212 judges whether or not an SFP or a port whose value is more than the corresponding threshold value is any of the normal ports (ports A-H). If the switching circuit 212 judges it is not a normal port (S302: NO), more specifically, if the switching circuit 212 judges it is the backup port (port Z), the switching circuit 212 outputs a "no-backup-port" message to a log within the microprocessor 151. This is because there is no port to be switched to since the backup port has already been used. Accordingly, in step S305, the switching circuit 212 closes the backup port, since it cannot be used, then terminates the processing.

If the switching circuit 212 judges, in step S302, a port whose value is more than the corresponding threshold value is any of the normal ports (S302: YES), the switching circuit 212 reads, in step S305, port group information from the port group information holding unit 214. Then in step S306, the switching circuit 212 judges whether or not the targeted port is grouped. More specifically, the switching circuit 212 judges whether or not an "ON" flag is set for the targeted port. If the targeted port is judged as not being grouped (S306: NO), the switching circuit 212 outputs, in step S307, a "no-port-group" message to a log within the microprocessor 151. Then in step S308, the switching circuit 212 closes the targeted normal port, and then terminates the processing. This is because there is no port to be switched to, since the targeted port has not been grouped.

If the switching circuit 212 judges, in step S306, that the targeted port is grouped (S306: YES), the switching circuit 212 reads, in step S309, the SFP information table 300 or the port information table 400. Then in step S310, the switching circuit 212 judges whether or not any of the values for the SFP and port that are backup ports is more than a corresponding threshold value. If the switching circuit 212 judges there is one whose value is more than the corresponding threshold value (S310: YES), the switching circuit 212 outputs, in step S311, a "cannot-use-backup-port" message to a log within the microprocessor 151. This is because the backup port cannot be used since the value for the backup port is more than the corresponding threshold value. Then in step S312, the switching circuit 212 closes the targeted normal port and backup port, and then terminates the processing.

If the switching circuit 212 judges, in step S310, there is no SFP or port whose value is more than a corresponding threshold value (S310: YES), the switching circuit 212 outputs, in step S313, a "port-switching" message to a log within the microprocessor 151. Then in step S314, the switching circuit 212 copies port information stored in the normal port information table 800 to the backup port information table 900. Accordingly, in step S315, the switching circuit 212 judges whether or not that copy is complete. If that copy is not complete (S315: NO), the switching circuit 212 outputs, in step S316, a "port-information-copy-failed" message to a log within the microprocessor 151. Then in step S317, the switching circuit 212 closes the normal ports and backup port, and then terminates the processing. This is because the backup port cannot be used unless copying of port information is complete.

If the switching circuit 212 judges, in step S315, that the copy has been completed (S319: YES), the switching circuit 212 issues, in step S318, an enable command to the backup port, thereby enabling the backup port. In step S319, the switching circuit 212 judges whether or not enabling of the backup port is complete. If enabling of the backup port is not complete (S319: NO), the switching circuit 212 outputs, in step S320, a "backup-port-enabling-failed" message to a log within the microprocessor 151. Then in step S321, the switching circuit 212 closes the normal ports and backup port, and then terminates the processing. This is because the backup port cannot be used unless enabling of the backup port is complete.

If the switching circuit 212 judges, in step S319, that enabling of the backup port is complete (S315: YES), the switching circuit 212 issues, in step S322, a disable command to a targeted normal port, thereby disabling the aforementioned targeted normal port. In step S323, the switching circuit 212 judges whether or not disabling of the aforementioned targeted normal port is complete. If disabling of the aforementioned targeted normal port is not complete (S323: NO), the switching circuit 212 outputs, in step S324, a "normal-port-disabling-failed" message to a log within the microprocessor 151. Then in step S325, the switching circuit 212 closes the targeted normal port, and then terminates the processing.

If the switching circuit 212 judges, in step S323, disabling of the aforementioned targeted normal port is complete (S323: YES), the switching circuit 212 reads, in step S326, information on the targeted normal port from the SFP information table 300 and the port information table 400. More specifically, the switching circuit 212 reads information on the normal port, which has been switched to the backup port.

In step S327, the switching circuit 212 judges whether or not any of the port information on the normal ports exceeds a threshold value set in a port threshold value table. If any of port information on the normal ports exceeds the threshold value (S327: NO), the switching circuit 212 returns to step S326.

If the switching circuit 212 judges, in step S327, that none of the port information for the normal ports exceeds the threshold value (S327: YES), the switching circuit 212 outputs, in step S328, a "port-switching" message to a log within the microprocessor 151. Incidentally, if none of port information for the normal ports, which are switched to the backup-port, exceeds the threshold value, it indicates that, for example, a user changed a port, etc., so that the normal port in which a failure occurred went back to its normal status, and as a consequence the use of the backup port became unnecessary. In step S329, the switching circuit 212 issues an enable command to a targeted normal port, thereby enabling that normal port. Then in step S330, the switching circuit 212 judges whether or not enabling the targeted normal port is complete.

If the switching circuit 212 judges, in step S330, that enabling of the targeted normal port is not complete (S330: NO), the switching circuit 212 outputs, in step S331, a "normal-port-enabling-failed" message to a log within the microprocessor 151. Then in step S332, the switching circuit 212 closes the targeted normal port, and then terminates the processing.

If the switching circuit 212 judges, in step S330, that enabling of the targeted normal port is complete (S330: YES), the switching circuit 212 issues, in step S333, a disable command to the backup port, thereby disabling the backup port. Then in step S334, the switching circuit 212 judges whether or not disabling of the backup port is complete. If disabling the backup port is not complete in step S334 (S334: NO), the switching circuit 212 outputs, in step S335, a "back-up-port-disabling-failed" message to a log within the microprocessor 151. Then in step S336, the switching circuit 212 closes the backup port, and then returns to step S301.

On the other hand, if the switching circuit 212 judges, in step S334, that disabling of the backup port is complete (S334: YES), the switching circuit 212 returns to step S301. After the switching circuit 212 outputs again a "SFP-more-than-threshold-value" message or a "port-more-than-threshold-value" message to a log within the microprocessor 151, the switching circuit 212 executes the above-described steps again.

According to the storage system 1 in the first embodiment, when a failure occurs in any of ports SFP-A171-H178 in the fiber unit 140, which is disposed in the storage device 100 and connects the storage device 100 and the server 10, data communications with the server 10 can be continued by switching any of the SFP-A171-H178 in which a failure has occurred to the SFP-Z179. Accordingly, switching any of the SFP-A171-H178, in which a failure has occurred, to the SFP-Z179 can be performed at the side of the storage device 100, so that processing for alternating paths executed in the server 10 will not be necessary.

In the above-described first embodiment, the storage device 100 is described with reference to the case when the fiber unit 140 is used as an interface for the connection to the server 10. However, the invention can be applied to other interfaces that do not use a fiber cable for a connection.

Second Embodiment

Next, a second embodiment will be described. The second embodiment will be described with reference to the case where two backup ports are arranged in the fiber unit 140. Incidentally, components the same as those in the first embodiment will be numbered with the same reference numerals as those used in the first embodiment, and their detailed descriptions will be omitted. Furthermore, the case where two backup ports are arranged in the fiber unit 140 will be described in the second embodiment, but the fiber unit 140 may be configured to include three or more backup ports.

FIG. 21 is a diagram showing the configuration of the fiber unit 140. the fiber unit 140 includes splitters B 199A, 199B and ports 145A, 145B, which are the backup ports. The port 145A includes an SFP-Z179A and a protocol chip 185A; and the port 145B includes an SFP-Z179B and a protocol chip 185B. Furthermore, the splitter B 199A is connected to the splitters A 191-194; and the splitter B 199B is connected to the splitters A 195-198.

The fiber unit 140 is configured in the above manner so that, when a failure occurs in any of the ports 191-194 that are normal ports, the storage system 1 can continue to send and receive data to/from the server 10 by switching the normal port to the port 145 A, which is a backup port; and when a failure occurs in any of the ports 195-198 that are normal ports, the storage system 1 can continue to send and receive data to/from the server 10 by switching the normal port to the port 145B, which is a backup port.

As described above, even when the storage device 100 is configured to include two backup ports, the same advantageous effects as those in the first embodiment can be achieved. Furthermore, since two backup ports are provided, even the situation where failures simultaneously occur in two normal ports can be handled.

(Difference from Zoning Function)

It is known that fibre channel switches have a function so-called "zoning." This zoning is a fabric management service for creating the subset of a logical device within a SAN (Storage Area Network). The zoning is a means for dividing resources for the purpose of management and access control.

Zoning makes it possible to create a more highly-partitioned SAN; to create barriers between different operating environments; to create definition user-group; and to provide a subset of the Logical Fabrics. Also, zoning makes it possible to independently create test areas (maintenance areas) within the Fabrics. Accordingly, a SAN can be flexibly managed by means of zoning, so that it can fulfill the respective purposes provided in defined user-groups.

The zoning function can partition a SAN and connect different kinds of OSs (Operation Systems), but cannot switch port units. Furthermore, the zoning function implements switching an alternate path by the use of path switching software disposed within a host device. On the other hand, the configuration in which a backup port is used, which is described in the embodiment, can implement neither partitioning a SAN nor connecting different kinds of OSs, but can implement switching port units. The invention is different from zoning on the point that it can implement switching to an alternate path as an internal function of the storage device 100.

Other Embodiments

The storage system 1 in the above-described embodiment includes the server 10 and the storage device 100 connected to the server 10 via the fiber cable; the storage device 100 includes the fiber unit 140 within the channel adaptor 111; the fiber unit 140 performs data communication with the server 10 through the use of the SFPs-A171-H178 and SFP-Z179; the channel adaptor 111 is provided with: the SFPs-A171-

H178 performing data communication with the server 10; the SFP-Z179 performing data communication with the server 10 in place of the SFPs-A171-H178 and SFP-Z179; and the microprocessors 151-153 switching, when a failure occurs in any of the SFPs-A171-H178, any of the SFPs-A171-H178, in which the failure occurred, to the SFP-Z179. It should be understood that the present invention is not limited to these configurations.

Furthermore, the microprocessors 151-153 in the embodiment include the SFP threshold value table 300 and the port threshold value table 400 both providing threshold values with each item (331-335, 431-442) so as to detect whether or not a failure has occurred in the SFPs-A171-H178 and the error detection circuit 211 monitoring whether or not any value for the SFPs-A171-H178 is more than the corresponding value provided with each item in the SFP threshold value table 300 and the port threshold value table 400; wherein the microprocessors 151-153 judge that a failure has occurred if the error detection circuit 211 finds that a value is more than the corresponding threshold value. However, it should be understood that the present invention is not limited to these configurations.

Moreover, the microprocessors 151-153 include a monitor processing unit (S326, S327) for monitoring, after switching any of the SFPs-A171-H178, in which a failure has occurred, to the SFP-Z179, whether or not all the items provided with any of the SFPs-A171-H178, in which the failure has occurred, exceed the corresponding values provided in the SFP threshold value table 300 and the port threshold value table 400; and if the monitor processing unit (S326, S327) finds that all the items do not exceed the corresponding threshold values, the microprocessor 151 switches the SFP-Z 179 to any of the SFPs-A171-H178 in which a failure has occurred. However, it should be understood that the present invention is not limited to these configurations.

The SFPs-A171-H178 and switches within the fibre channel switch 11 in the server 10 correspond one-to-one with each other; the SFPs-A171-H178 and switches interconnect one another via the splitters A 191-198 and respectively perform data communications with the server; and the SFP-Z179 connects to the splitter B 199 which is connected to the splitters A 191-198 and performs data communications with the server 10. However, it should be understood that the present invention is not limited to these configurations.

Incidentally, in the above respective embodiments, a backup port is provided and used to continue sending and receiving of data when a failure occurs in any of normal ports, however, the system can be configured, without providing a backup port, to continue sending and receiving of data when a failure occurs in any of normal ports by using another normal port.

The present invention can be broadly applied in a storage system and an optical module switching method for the storage system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system comprising:
a storage device connected to a host computer via a communication line, the storage device comprising a communication controller performing data communication with the host computer by using optical modules,
wherein the communication controller is provided with:
first optical modules performing data communication with the host computer;
a second optical module performing data communication with the host computer, in place of the first optical modules; and
a controller switching, when a failure occurs in any of the first optical modules, a first optical module in which the failure occurred to the second optical module,
wherein the first optical modules and switches in the host computer correspond one-to-one with each other, and the first optical modules and the switches respectively connect via a first splitter, whereby they perform data communication, and
wherein the second optical module connects to a second splitter that connects to the respective first splitters, and performs data communication with the host computer.

2. The storage system according to claim 1, wherein the controller comprises:
a threshold value table providing each predetermined item with a threshold value for detecting whether or not a failure has occurred in a first optical module; and
a first monitor processing unit that monitors whether or not the first optical module is more than the threshold value provided for the each predetermined item,
wherein the controller judges that a failure has occurred when the first optical module is more than the threshold value provided for each predetermined item.

3. The storage system according to claim 2, wherein the controller comprises a second monitor processing unit that monitors, after switching the first optical module in which a failure has occurred to the second optical module, whether or not all the predetermined items of the first optical module in which the failure has occurred are more than the threshold value provided in the threshold value table, and
wherein the controller switches the second optical module to the first optical module in which the failure has occurred when the second monitor processing unit finds all the predetermined items of the first optical module in which the failure has occurred do not exceed the threshold value provided in the threshold value table.

4. The storage system according to claim 3, wherein the threshold value table includes:
a first threshold value table that is provided with a plurality of items for monitoring the status of the optical modules, and
a second threshold value table that is provided with a plurality of items for monitoring the communication status of the optical modules.

5. The storage system according to claim 1, wherein the communication line is a fiber cable.

6. An optical module switching method for a storage system comprising:
a storage device connected to a host computer via a communication line, the storage device comprising a communication controller performing data communication with the host computer by using optical modules,
wherein the communication controller is provided with:
first optical modules performing data communication with the host computer; and
a second optical module performing data communication with the host computer, in place of the first optical modules,
wherein the optical module switching method comprising the step of:

switching, when a failure has occurred in any of the first optical modules, the first optical module in which the failure has occurred to the second optical module, wherein the first optical modules and switches in the host computer correspond one-to-one with each other, and the first optical modules and the switches respectively connect via a first splitter, whereby they perform data communication, and wherein the second optical module connects to a second splitter that connects to the respective first splitters, and performs data communication with the host computer.

7. The optical module switching method for a storage system according to claim 6, further comprising the steps of:

monitoring, based on a threshold value table providing each predetermined item with a threshold value for detecting whether or not a failure has occurred in a first optical module, whether or not the first optical module is more than the threshold value provided for each predetermined item, wherein if the first optical module is more than the threshold value provided for each predetermined item in the monitoring step, the failure is judged as having occurred during the switching step.

8. The optical module switching method for a storage system according to claim 7, further comprising the steps of:

monitoring, after switching the first optical module in which the failure has occurred to the second optical module, whether or not all the predetermined items of the first optical module in which the failure has occurred are more than the threshold value provided in the threshold value table, and switching the second optical module to the first optical module in which the failure has occurred when the second monitor processing unit finds all the predetermined items of the first optical module in which the failure has occurred do not exceed the threshold value provided in the threshold value table.

9. The optical module switching method for a storage system according to claim 8, wherein the threshold value table includes:

a first threshold value table that is provided with a plurality of items for monitoring the status of the optical modules, and a second threshold value table that is provided with a plurality of items for monitoring the communication status of the optical modules.

* * * * *